(12) United States Patent
Gidron et al.

(10) Patent No.: US 8,270,951 B2
(45) Date of Patent: *Sep. 18, 2012

(54) RULE-BASED SYSTEM AND METHOD FOR MANAGING THE PROVISIONING OF USER APPLICATIONS ON LIMITED-RESOURCE AND/OR WIRELESS DEVICES

(75) Inventors: Yoad Gidron, Yokneam Illit (IL); Ophir Holder, Haifa (IL); Haim Teichholtz, Bitan Aharon (IL); Benny Reich, Haifa (IL); Yaron Gur-Ari, Qiryat Bialik (IL); Michael Schiller, Haifa (IL)

(73) Assignee: Alcatel Lucent, Paris (FR)

( * ) Notice: Subject to any disclaimer, the term of this patent is extended or adjusted under 35 U.S.C. 154(b) by 1171 days.

This patent is subject to a terminal disclaimer.

(21) Appl. No.: 11/945,544

(22) Filed: Nov. 27, 2007

(65) Prior Publication Data

US 2008/0090551 A1    Apr. 17, 2008

Related U.S. Application Data

(63) Continuation of application No. 10/431,437, filed on May 8, 2003, now Pat. No. 7,330,717, which is a continuation-in-part of application No. 10/240,409, filed as application No. PCT/IL02/00139 on Feb. 21, 2002, and a continuation-in-part of application No. 09/987,514, filed on Nov. 15, 2001, now Pat. No. 7,283,811.

(60) Provisional application No. 60/270,638, filed on Feb. 23, 2001, provisional application No. 60/280,849, filed on Apr. 3, 2001, provisional application No. 60/270,638, filed on Feb. 23, 2001.

(51) Int. Cl.
    *H04M 11/10* (2006.01)

(52) U.S. Cl. .................. 455/414.1; 455/418; 455/426.1; 709/219

(58) Field of Classification Search .................. 455/418, 455/426.1, 414.1; 707/600; 709/318, 328, 709/219; 714/43
See application file for complete search history.

(56) References Cited

U.S. PATENT DOCUMENTS

| | | | |
|---|---|---|---|
| 5,430,719 | A | 7/1995 | Weisser, Jr. |
| 5,815,665 | A | 9/1998 | Teper et al. |
| 6,226,364 | B1 | 5/2001 | O'Neil |
| 6,393,412 | B1 | 5/2002 | Deep |
| 6,452,930 | B1 | 9/2002 | Seidman |
| 6,496,979 | B1 | 12/2002 | Chen et al. |

(Continued)

FOREIGN PATENT DOCUMENTS

WO    WO 02/067528    8/2002

(Continued)

*Primary Examiner* — Danh Le
(74) *Attorney, Agent, or Firm* — Wall & Tong, LLP

(57) ABSTRACT

A system and a method for charging for directed provisioning and using of dynamic content to limited resource devices, through an integrated platform which handles all aspects of aggregation and management of such dynamic content. The integrated platform features a billing system for performing billing actions. The billing system of the present invention interacts with other components of the integrated platform in order to be able to determine the charge for particular triggering events, such as downloading dynamic content, and/or events which are actually triggered by the application itself. The charge is preferably determined according to one of a plurality of rules, as applied by a rules engine of the billing system. These rules are part of a charging policy, which may optionally be determined by the content provider.

14 Claims, 7 Drawing Sheets

U.S. PATENT DOCUMENTS

| | | | |
|---|---|---|---|
| 6,553,178 B2 | 4/2003 | Abecassis | |
| 6,591,095 B1 | 7/2003 | Palaniswamy et al. | |
| 6,615,034 B1 | 9/2003 | Alloune et al. | |
| 6,647,257 B2 | 11/2003 | Owensby | |
| 6,658,000 B1 | 12/2003 | Raciborski et al. | |
| 6,701,521 B1 | 3/2004 | McLlroy et al. | |
| 6,757,530 B2 | 6/2004 | Rouse et al. | |
| 6,773,344 B1 | 8/2004 | Gabai et al. | |
| 6,832,230 B1 | 12/2004 | Zilliacus et al. | |
| 6,832,341 B1 * | 12/2004 | Vijayan | 714/43 |
| 6,907,239 B1 | 6/2005 | Sivula | |
| 7,092,398 B2 | 8/2006 | Schweitzer | |
| 7,225,238 B1 * | 5/2007 | Dantu et al. | 709/219 |
| 7,373,428 B1 * | 5/2008 | Armstrong et al. | 709/249 |
| 2001/0019960 A1 * | 9/2001 | Takayama et al. | 455/456 |
| 2002/0046299 A1 * | 4/2002 | Lefeber et al. | 709/318 |
| 2002/0061743 A1 | 5/2002 | Hutcheson et al. | |
| 2002/0065067 A1 | 5/2002 | Khare et al. | |
| 2002/0069244 A1 | 6/2002 | Blair et al. | |
| 2002/0083017 A1 | 6/2002 | Kanniainen | |
| 2002/0112171 A1 | 8/2002 | Ginter et al. | |
| 2002/0142760 A1 | 10/2002 | Gidron et al. | |
| 2003/0009385 A1 | 1/2003 | Tucclarone et al. | |
| 2003/0055995 A1 | 3/2003 | Ala-Honkola | |
| 2003/0060188 A1 | 3/2003 | Gidron et al. | |
| 2003/0101135 A1 | 5/2003 | Myatt et al. | |
| 2003/0110044 A1 | 6/2003 | Nix et al. | |
| 2004/0014459 A1 | 1/2004 | Shanahan | |
| 2004/0058673 A1 | 3/2004 | Irlam et al. | |

FOREIGN PATENT DOCUMENTS

| | | |
|---|---|---|
| WO | WO 02/071287 | 9/2002 |

* cited by examiner

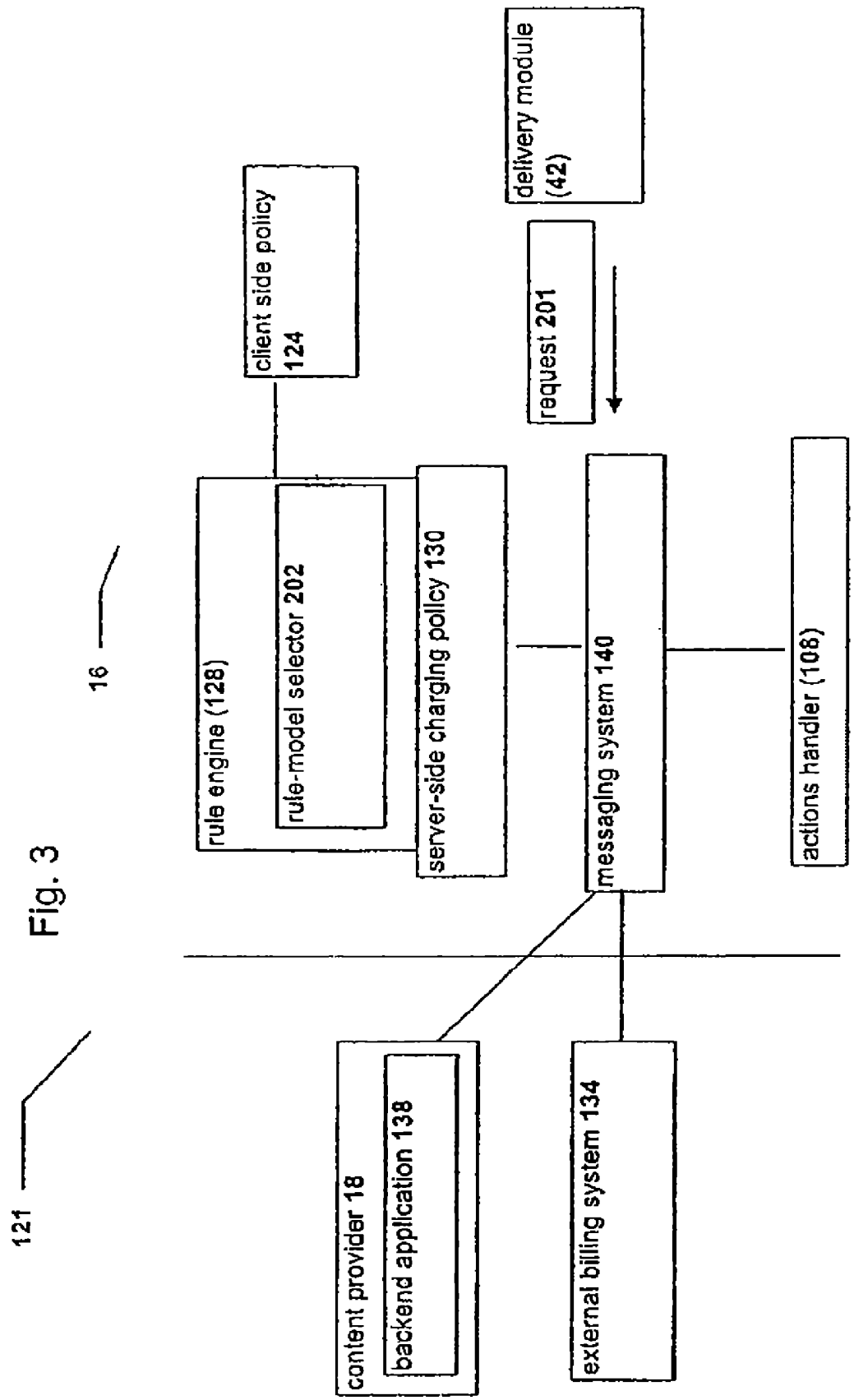

RULE-BASED SYSTEM AND METHOD FOR MANAGING THE PROVISIONING OF USER APPLICATIONS ON LIMITED-RESOURCE AND/OR WIRELESS DEVICES

CROSS REFERENCE TO RELATED APPLICATIONS

This application is a continuation of commonly owned Ser. No. 10/431,437 filed on May 8, 2003 U.S. Pat. No. 7,330,717 B2, issued Feb. 12, 2008, entitled RULE-BASED SYSTEM AND METHOD FOR MANAGING THE PROVISIONING OF USER APPLICATIONS ON LIMITED-RESOURCE AND/OR WIRELESS DEVICES, which patent is a continuation-in-part of commonly owned pending U.S. patent application Ser. No. 10/240,409, filed Oct. 1, 2002, entitled SYSTEM AND METHOD FOR CHARGING FOR DIRECTED PROVISIONING OF USER APPLICATIONS ON LIMITED RESOURCE DEVICES, which is a 371 of International Application No. PCT/IL02/00139, filed Feb. 21, 2002, entitled SYSTEM AND METHOD FOR CHARGING FOR DIRECTED PROVISIONING OF USER APPLICATIONS ON LIMITED-RESOURCE DEVICES, which claims the benefit of U.S. Provisional Application No. 60/270,638, filed Feb. 23, 2001, and claims the benefit of U.S. Provisional Application No. 60/280,849, filed Apr. 3, 2001, and is a continuation-in-part of U.S. patent application Ser. No. 09/987,514, filed Nov. 15, 2001, now U.S. Pat. No. 7,283,811 entitled SYSTEM AND METHOD FOR AGGREGATION OF USER APPLICATIONS FOR LIMITED-RESOURCE DEVICES, which application claims the benefit of U.S. Provisional Application No. 60/270,638, filed Feb. 23, 2001; all such prior applications are incorporated herein by reference.

FIELD OF THE INVENTION

The present invention relates to a system and a method for directed provisioning of user applications and other content items to limited-resource and/or wireless devices, and in particular, to such a system and method in which business logic for managing and charging for such applications is flexibly customized according to a plurality of rules. Examples of suitable devices include, but are not limited to, cellular telephones and handheld computers.

BACKGROUND OF THE INVENTION

Cellular telephones have recently become increasingly popular for mobile voice communication, as well as for the exchange of text messages and other types of data. For voice communication, cellular telephone systems provide similar services as the fixed, wire-based telephony system, or PSTN (public switched telephony network), except that cellular telephone systems are based upon signal transmission through radio frequency signals rather than wires. Hence, cellular telephones are also termed "wireless telephones", and communication over such telephones is termed "wireless communication".

One advantage of cellular telephones is that cellular telephones permit mobile communication, such that subscribers are able to communicate while traveling, or otherwise when subscribers are not at a fixed physical location. In addition, cellular telephones permit subscribers to be contacted regardless of the location of the subscribers. These advantages of mobile communication are also useful for the exchange of data, such as for text messages and even Web pages, for example. Cellular telephones are able to receive text messages through message exchange protocols such as SMS (short message service), for example, which permit one-to-one communication between cellular telephones through text messages. In addition, protocols such as the WAP (wireless application protocol) and MMS (multimedia messaging system) enable cellular telephones, which are suitably enabled to receive Web pages and multimedia messages. Thus, cellular telephones potentially provide a full communication solution for all of the different types of electronic communication for a subscriber.

However, cellular telephones have a number of disadvantages over other types of computational devices which are used to exchange data, such as desktop computers, for example. Cellular telephones have limited resources, and as such can be considered to be limited resource devices. Cellular telephones are limited by at least one of available memory, storage space, size of the display screen, and/or computational power, as represented by the ability to perform various data processing tasks. These limitations are imposed by the requirements of portability, convenient and simple operation, battery lifetime, weight and size. In addition, the type of limitations and the hardware specifications of each cellular telephone, or other related handheld device, also differ between, cellular telephone service providers and even manufacturers. Thus, designing a single type of application which is suitable for all cellular telephones, for example, is clearly very difficult.

In addition, the heterogeneity of this computational environment extends to the types of communication protocols according to which these different cellular telephones communicate for data transmission. As described above, three of these protocols include SMS, for character-based messages only, MMS, for multimedia messages and WAP, for more browsing Web-based content which may also include graphics. Other protocols include "I-mode", the packet-based cellular telephone data transmission protocol of the Japanese company, NTT DoCoMo (Japan).

Unlike the static content which is delivered through WAP or I-mode, the Java 2 Micro Edition (J2ME) standard provides a platform for the development and implementation of dynamic content on limited-resource mobile devices. J2ME is a special version of the popular Java programming language (originally developed by Sun Microsystems), which was adapted to the limitations of consumer and embedded devices with limited resources. J2ME is being defined as an industry standard by companies which manufacture limited resource devices, such as Motorola, Nokia and Palm. Another emerging standard is the Generic Content Download Over The Air Specification, which is defined by the Open Mobile Alliance (OMA). This specification defines a simple protocol which allows multiple media types, such as image, audio and video files to be downloaded over the air to mobile devices.

JSR 124, which is defined by the Java Community Process (JCP), defines a Java 2 Enterprise Edition (J2EE) extension for client provisioning of J2ME applications and other content types. However, this Java Specification Request (JSR) defines only some of the external interfaces of such systems, while the business logic is left out of scope. The business logic of the provisioning system includes elements such as billing models, payment methods, notification schemes, discounts, etc. Such elements typically vary from one service provider to another and thus are not addressed by existing standards.

SUMMARY OF THE INVENTION

The background art does not teach or suggest a system and a method for flexibly defining and customizing the business logic of a provisioning system that delivers user applications and other types of content to limited resource and/or wireless devices.

The present invention overcomes these deficiencies of the background art by providing an extendible and customizable system that is driven by a plurality of rules through a rule engine. The rule engine is preferably an event-driven system using discrete, sequential decisions to apply actions as a reaction to the occurrence of various events. The rule engine preferably implements the Event Condition Action (ECA) model, in which each rule is triggered by a specific event type. The rule specifies a condition that is evaluated against the properties of the event and other properties that are referred by the context of the event. If the condition is met, the action or actions are executed. The rule engine is preferably a rule-based system using discrete, sequential decisions to execute specific actions as a reaction to events that occur in the system.

The present invention may optionally and preferably be used as a platform for the implementation of one or more business policies. The rule engine preferably allows the service provider to customize the behavior of the provisioning system by defining business policies for billing, payment, promotions, notifications, and so forth. Apart from billing and/or payment, other examples of important polices include but are not limited to, policies for provisioning/payment flow; notifications and push of content; fraud detection; and discounts and bundled offers.

According to preferred embodiments, the present invention may optionally and preferably be configured to charge based on different events according to the flow of events in provisioning. The initial request for provisioning (downloading or other delivery of content) may optionally be the discovery by the subscriber, possibly from browsing through categories, whereafter the subscriber optionally selects the desired content item which constitutes a downloadable unit. Optionally, the subscriber may view one or more menus or other displays of such categories in order to select the desired content. Alternatively or additionally, the subscriber may optionally receive a notification about content, for example about the availability of new content. Such a notification is preferably implemented as a message that is sent to the subscriber device, and through which the subscriber is preferably able to request the item of content.

When the item is requested, the rule engine preferably reviews the different options for the specific item, each of which represent different conditions for execution of one or more actions. These include, but are not limited to, possible payment methods, pricing schemes, one-time-use pricing, pricing for subscribers, and others. The rule engine most preferably performs actions at every stage of the provisioning service and the delivery service.

According to the preferred embodiments of the present invention, rules are associated with each of the above stages of content delivery. These rules may optionally be divided into rules covering synchronous interaction for synchronous reaction, as opposed to asynchronous reaction for asynchronous reaction. Synchronous reaction requires, for example, that the payment system be linked to the content delivery system, such that the capability of the subscriber to pay for the content is preferably assured before the content is downloaded. Asynchronous reaction, on the other hand, permits the billing system and the content delivery system to optionally operate without direct interaction, as the subscriber receives a monthly bill after the content is delivered.

As used hereinafter, synchronous processing refers to a sequence of operations in which operations are executed in controlled time coincidence with one another such that one event is made conditional to the execution of another event. The term asynchronous hereinafter relates to operations which are executed out of time coincidence, often in parallel where multiple events are executed, often in different program threads without any conditionality between them.

Non-limiting examples of rules include synchronous events such as the rule engine authorization action, occurring immediately after the event of the subscriber ordering the content, to determine whether the subscriber is prepaid and if so, acting to verifying if the subscriber has enough credit to request the action. Another such policy may optionally be the choice of action to take when the balance is found to be insufficient. The cellular operator may decide to inform the client directly, offer an opportunity to pay more in advance or any other policy configured in the most preferred policy editor.

According to another preferred embodiment of the present invention, the cellular operator policies may optionally decide where in the chain of events to charge the subscriber. These choices include but are not limited to, charging immediately once the subscriber has pressed the purchase button, or else optionally after the subscriber has successfully downloaded the content.

According to another preferred embodiment of the present invention, the cellular operator policies may optionally include push of content. A non-limiting example of a "push" technology is MMS (multimedia message service) which is a standardized mechanism for transmission of messages with multimedia content. Unlike the transfer protocol for Java (HTTP—hypertext transfer protocol) MMS messages are routed through a dedicated server, called the MMS relay, which pushes MMS messages to devices. Upon the event of the cellular subscriber selecting multimedia content, the rule engine checks the condition of whether the content should be delivered through MMS as opposed to HTTP, and if so generates a push event in the MMS server.

According to another preferred embodiment of the present invention, the cellular operator policies may optionally include a set of rules for sending notifications. These may include events triggered on the publishing of a new content item in the content catalog of the provisioning system. This event is not generated as part of the series of events known as the provisioning flow. Instead, the event may be seen as forming part of the aggregation flow of content. Based on such an event, the rule engine may optionally carry out certain conditions, including but not limited to, checking if a subscriber has downloaded a previous version of a content item and has indicated the subscriber's intention to receive these notifications, or to send a message that a new version is available and so forth.

According to another preferred embodiment of the present invention, the cellular operator policies may optionally include a set of rules for permitting discounts to subscriber or a content item. Such a set of rules may take the non-limiting form of checking a predefined condition such as if the subscriber has downloaded more than a certain number of items every month, giving the subscriber a discount on certain further discounts, lowering the price on a specific, preferred, piece of content, lowering the price on the first predetermined number of downloads of a certain item and then normalizing the price, giving a certain discount for content in the initial stages of subscription and so forth.

According to another preferred embodiment of the present invention, the cellular operator policies may optionally include a set of rules defining a bundled offer, in which the event of buying a certain piece of content is considered as a condition when buying another piece of content. Such a set of rules may take the non-limiting form of giving a second item for half-price if a first item is purchased, mercantile combinations of groups of items from the same producer—allowing the subscriber to buy a predetermined number and get an additional item without charge, provision of credit points for each purchase which may be redeemed at a certain value and so forth. It must be noted here that the rule engine is stateless and discrete, inasmuch as records of subscriber purchases are kept in the subscriber's record, which is accessible to the rule engine, but each purchase event is a unique and discrete event, evaluated separately. The engine thus optionally searches for previous transactions by the subscriber which may have a bearing on the rules, rendering each previous purchase into a form of voucher to be taken into consideration in the purchase of another item.

According to other preferred embodiments of the present invention, there may also optionally be multiple conditions for each rule and also multiple actions, as a condition may optionally lead to an additional action, not limited to only a charge, but including the award of the discount, push of content and others.

According to another preferred embodiment of the present invention, the cellular operator policies may optionally include a set of rules defining the suspicion of fraud. Such a set of rules may take the non-limiting form of detecting repeated downloads of the same content to different cellular devices by a single subscriber and so forth. The actions in response to fraud may then include issuing an alert to a human operator, blocking the subscriber and so forth.

It will be noted that the same rule engine is used across the entire system to apply the various policies, thereby giving the service provider more control over the actions of the system resultant from each event.

Policies can optionally and preferably be easily created and edited through the policy editor, which creates rule bases that are stored in XML files and are read by the rule engine.

Throughout this document, the term "plugging" is used to describe the process by which an existing set of behaviors is extended by adding functionality to the rule engine of the present invention, thereby "plugging" new building blocks, such as functions (used in the context of the condition) and actions into the existing structure.

According to the preferred embodiments of the present invention, there is provided an integrated platform enabling a provider to charge for directed provisioning and usage of downloadable content on limited resource or wireless communication devices, as well as the handling of all aspects of aggregation and management of such downloadable content. The integrated platform preferably features a charging mechanism for performing billing actions and interaction with other components of the integrated platform in order to be able to determine the price for particular triggering events, such as downloading a unit of content, and/or events which are actually triggered by the application itself. The price is preferably determined according to one of a plurality of rules, as applied by a rules engine of the business logic system. These rules are part of a charging policy, which is typically determined by the service provider and possibly parameterized by the content provider. In addition, content providers can submit their own application-specific business policies which may or may not be associated with billing.

According to preferred embodiments the present invention, the engine may optionally include at least one, but preferably two internal modes of operation. Each such internal mode may optionally and preferably be associated with a separate instance of the rule engine. Each separate instance of the rule engine may optionally have its own set of rules stored in an optionally separate rule base. The main difference between the two modes of operation is the way in which the rule engine processes events either synchronously or asynchronously depending on their source, nature and requirements.

In an optional asynchronous environment, the rule engine acts as a listener, which waits for incoming messages which the messaging system places in a dedicated queue after receipt of the event. These message queues and listeners manage the interactions between two separate processes, and the rule engine process is only aware of the event queue by name without interaction with its activities where the message itself represents an event in the system. Optionally multiple engines may work on the same asynchronous queue to increase throughput and achieve high availability. Instances of the engine may also optionally be on different physical machines according to scalability and optimization requirements.

In an optional synchronous environment, the rule engine must be within the same process as the process which generates events. The rule engine thread may be included in a number of possible event generating modules, including but not limited to the delivery module, the aggregation module and so forth, and is always a local process in these modules— invoking a method, applying a rule and returning an answer within the thread.

Preferably, rule-model differentiation and load balancing allow the engine and its capacity to connect to the billing system to be highly scalable in order to be able to meet high levels of demand.

Hereinafter, the term "limited-resource device" refers to a computational device in which computational resources such as memory, storage space, network bandwidth and/or data processing capabilities are limited, particularly in comparison to desktop computers such as PCs (personal computers), for example.

Hereinafter, the term "network" refers to a connection between any two or more computational devices which permits the transmission of data.

Hereinafter, the term "computational device" includes, but is not limited to, personal computers (PC) having an operating system such as DOS, Windows™, OS/2™ or Linux; Macintosh™ computers; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to: laptops, hand-held computers (based on operating systems such as Symbian and Pocket PC), PDA (personal digital assistant) devices (e.g. Palm Pilot), cellular telephones, two-way pagers, any type of WAP (wireless application protocol) enabled device, wearable computers of any sort, and any device which can be connected to a network as previously defined and which has an operating system. Hereinafter, the term "Windows™" includes any version of this operating system by Microsoft Corp. (USA).

Hereinafter, the term "cellular communication device" refers to any type of wireless handset or device, including but not limited to cellular telephones or other types of computational device as defined above, which is capable of voice and/or data transfer through a radio frequency signal using any protocol for communication of data including amongst others TCP/IP or WAP as bearer technology for the transferal of content for example in the form of SMS, MMS, EMS, Java Applications and so forth, optionally through a connection to the PSTN (public switched telephone network).

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the present invention could be implemented as software, firmware or hardware, or as a combination thereof. For any of these implementations, the functions performed by the method could be described as a plurality of instructions performed by a data processor.

BRIEF DESCRIPTION OF THE DRAWINGS

The invention is herein described, by way of example only, with reference to the accompanying drawings, wherein:

FIG. 2A shows a schematic block diagram of an exemplary rule engine and content delivery system according to the present invention, while

FIG. 3 is a schematic block diagram of the functionality of an exemplary but preferred rule engine according to the present invention;

DESCRIPTION OF THE PREFERRED EMBODIMENTS

Figure 1:
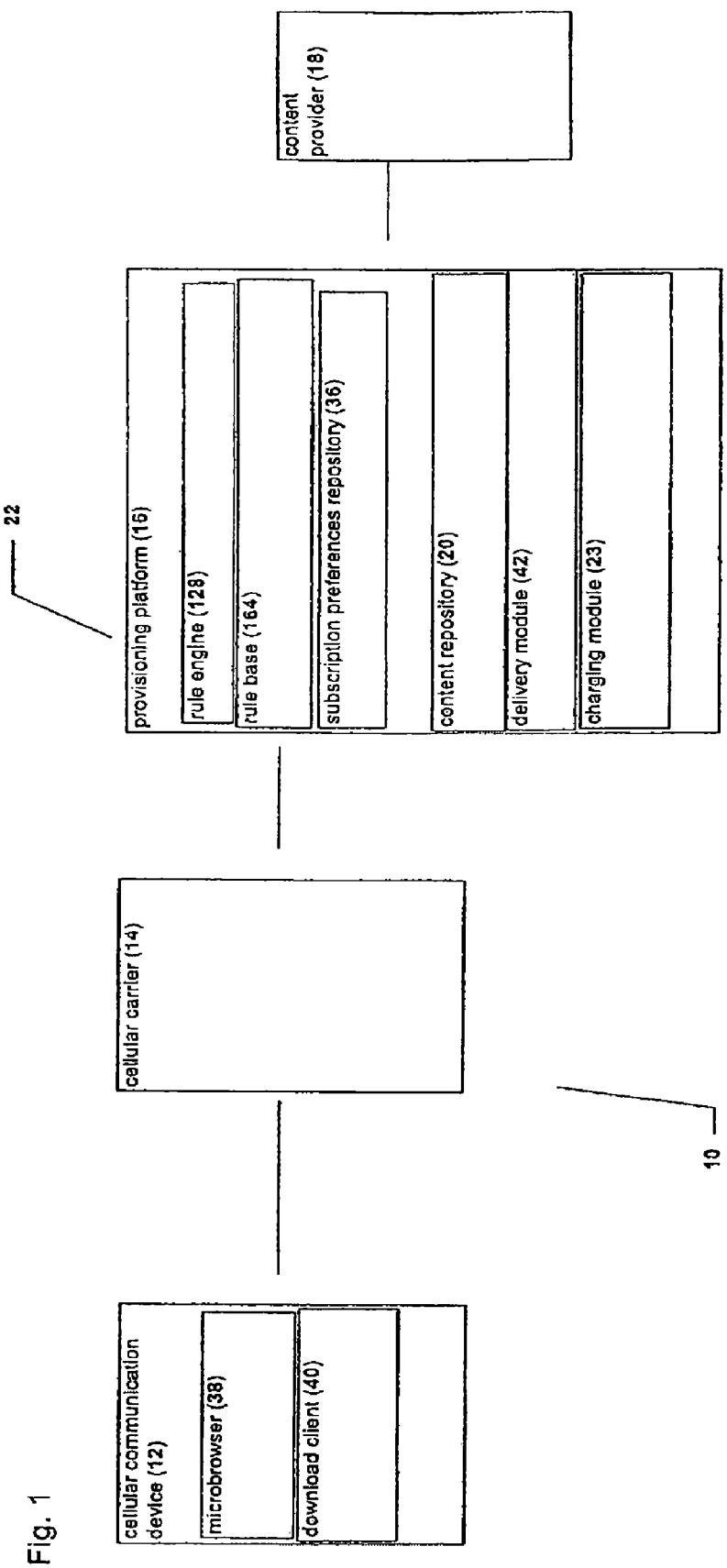
FIG. 1 is a schematic block diagram of an exemplary system according to the present invention.

The present invention is of a system and a method for controlling the business logic involved in providing downloadable content such as user applications for example, to limited resource or wireless devices. According to the present invention, an integrated platform which handles all aspects of business logic, aggregation and management of such downloadable content is provided. The integrated platform features a rule engine which governs various policies in the system, such as payment flow, pricing, promotions, notifications, discounts and fraud detection. Each policy is composed of one or more rules in an ECA (event-condition-action) format. That is, each rule is specified by a triggering Event, a Condition that is checked against the context of the event, and an Action that is executed if the condition is met.

Optionally, a charging policy may be embodied in the form of an "application level charging model". An application-level charging model provides the means for implementing different business models for different applications. That is, each application may have its own business logic model, as specified by its provider. This flexibility is achieved by collecting information about the activities of the application through runtime rules and applying dynamic charging models.

Different business logic policies may require synchronous or asynchronous rule handling in order to optimize response time, performance and scalability. According to the preferred embodiments of the present invention, the rule engine optionally and preferably takes no direct cognizance of previous events, and uses only sequential processing of discrete single events to determine validity. As used herein, synchronous processing refers to a sequence of operations in which operations are executed in controlled time coincidence with one another, and asynchronous operations are sequences of operations which are executed out of time coincidence. Synchronous operations are critical for example, in the charging of pre-paid subscribers where there is no way to correct errors post facto, and strict transaction protocols must be applied, whereas with subscribers that are billed after the fact, such strict protocols and controls would needlessly slow processing Rule processing may optionally include support for discounts, special offers, bundled offers, acknowledgement of failures and refunds, and so forth. The rule based engine may optionally access statistics regarding usage trends and demographics in a separate statistical database, where database is defined hereinafter as any information set organized for flexible searching and utilization.

A non-limiting example of an extended rule could optionally be to check if a specific application has been downloaded by a subscriber before. This operation queries a database containing the personal inventory of the subscriber and returns a Boolean result, thereby allowing the rule engine to effectively refer to previous events. When referring to previous events, the application of an extended rule optionally returns a value that may optionally be used inside a condition of a rule.

Another non-limiting example of an extension to the business logic is the capacity to define events sent to external systems (e.g., for reporting and monitoring) as a result of logic processing within the present invention. One non-limiting example of such an extension is the execution of Java code as a result of activating a rule, which could optionally send an alert to an external system. This method of expansion is another example of the previously described process of "plugging."

In addition the rule based engine may optionally process transactions using fuzzy logic to detect fraud, where fuzzy logic is defined hereinafter as any rule-based system which yields more than two truth values using the logic of probability. Such a system uses behavior pattern recognition to supply fraud candidates based on trends, probability and specific instances.

According to other preferred embodiments of the present invention, payment methods may optionally and preferably include at least a prepaid model and a postpaid model. The prepaid model is used when the subscriber has paid in advance for a limited amount of credit or services, such as a limited number of applications for example. The pre-paid model requires authorization for content delivery to be received before the content is actually delivered.

The postpaid model is useful when the subscriber is to be billed or otherwise charged after the application or other content has been delivered, for example, for subscribers who receive a monthly bill for content delivery. This model disassociates billing or charging for content delivery from the delivery process itself, such that receipt of the authorization for content delivery is preferably not required before delivery is at least initiated.

According to another embodiment new and customized models are preferably added through a built in policy editor which may optionally extend existing rules, or optionally create entirely new rules. These models are preferably stored as XML files which are accessible to the rule engine at runtime.

As used herein, the term "dynamic content" refers to a unit of content and/or to a set of instructions for execution by the limited resource or wireless (user) device, possibly interacting with a server side application across the network. The content may optionally include any type of media, including but not limited to, any one of audio data, video data, graphic images and text, any type of application which includes any type of media (such as any one or more of audio data, video data, graphic images and text) or a combination thereof. Preferably, the dynamic content includes such a set of instructions for execution by the device, which optionally and more preferably are written in an interpreted language such as Java, for example. However, the dynamic content optionally and most preferably also features one or more components of a user interface, for example in order to select a particular set of instructions and/or type of content.

The principles and operation of the present invention may be better understood with reference to the drawings and the accompanying description. It should be noted that although the following description centers around the subscriber device being a wireless, limited resource device, this is for the purposes of description only and is not intended to be limiting in any way.

Referring now to the drawings, FIG. 1 is a schematic block diagram of a system according to the present invention for delivery of dynamic content creation for, and delivery to limited resource and/or wireless device, collectively termed a subscriber device, including but not limited to a rule engine 128 which enables the implementation of various rules, including but not limited to aggregation policy, subscriber billing, advertising, content pushing and so forth. The present invention is described with regard to cellular communication devices as the subscriber devices, it being understood that this is for the purposes of illustration only and is not intended to be limiting in any way.

As shown, a system 10 features a cellular communication device 12, which preferably features a discovery application such as a microbrowser 38 for discovering various types of content. System 10 also preferably features a download client 40 for downloading and installing applications, and/or for handling any type of content, whether applications or other types of content, which as previously described, may be collectively termed "dynamic content". It should be noted that although the system of FIG. 1 is described with regard to Java as the application execution language, this is for the purposes of description only and is without any intention of being limiting in any way. The present invention could also, additionally or alternatively, be operative with other types of execution languages, as could easily be determined by one of ordinary skill in the art, such that these other types of execution languages are also considered to be within the scope of the present invention.

Cellular communication device 12 is operated by a subscriber (not shown), who subscribes to a cellular carrier 14. Cellular carrier 14 (also known as the operator) typically provides a number of different services through cellular communication device 12, including, but not limited to, voice communication and/or data transmission. Cellular carrier 14 may also include other types of functions, provided through a variety of different hardware and/or software components, as is well known in the art.

For the purposes of the present invention, cellular carrier 14 also manages a content provisioning platform 16 according to the present invention. As described in greater detail below, provisioning platform 16 features a number of different components, for the creation of dynamic content which is adaptable to a variety of devices such as cellular communication device 12; for the delivery of such dynamic content to cellular communication device 12 according to a flexible set of rules embodied in rule engine 128, and optionally other devices, preferably only as required or "on-demand"; and for optionally receiving such dynamic content from third party providers. System 10 preferably contains a delivery module 42 for actually delivering each item or unit of dynamic content (application) to cellular communication device 12, through different protocols.

With regard to the last feature, provisioning platform 16 is preferably in communication with content providers 18, of which only one is shown for the purposes of clarity and without any intention of being limiting. Content provider 18 preferably actually submits each such dynamic content to a content repository 20 of provisioning platform 16, which is managed by cellular carrier 14, acting as a service provider 22. Each unit of dynamic content, more preferably with any required and/or preferred modifications or specific implementations, may then be transmitted to cellular communication device 12 and/or another limited resource or wireless device (not shown). Optionally and most preferably, the subscriber subscribes to any particular dynamic content through cellular carrier 14, in order to receive such dynamic content through cellular communication device 12.

The act of subscription to any service or bundle of services is an event which is preferably processed by rule engine 128. Rules regarding subscriptions may include eligibility, age restriction, region restriction and others, all of which constitutes conditions to be verified by rule engine 128 before the action of subscription is permitted.

According to preferred embodiments of the present invention, the procedure for providing such a dynamic content through system 10 is preferably performed as follows. First, the dynamic content itself is preferably developed, for example by a third party such as content provider 18. More preferably, the dynamic content is created through an API (application programming interface) and set of tools according to the present invention, as described in greater detail below.

Next, content provider 18 preferably submits a new unit of dynamic content to service provider 22, which manages a provisioning service for such dynamic content. This procedure for submitting a new unit of dynamic content is preferably performed according to a standardized submission protocol. Next, service provider 22 preferably uses a set of tools according to the present invention in order to inspect and certify the submitted units of dynamic content. Optionally and most preferably, the dynamic content is also submitted with any other meta-information which may be required by another component of system 10. This information can include the form of the business logic rules which apply to rule engine and are preferably sent as XML instructions which are stored in rule base 164. These rules may include a plurality of operations, including but not limited to the pricing scheme, delivery information, associated promotions, push schedule, sampling period and so forth.

Rule engine 128 then accesses the rule-set known as its content aggregation policy Here the event of an upload attempt may invoke a number of conditions, including but not limited to, supplier eligibility, content appropriateness, need to push content immediately and so forth, each of which leads to an appropriate action by rule engine 128, and each of which is preferably customized by each cellular provider 14.

If the dynamic content is found to be suitable, service provider 22 then preferably approves and publishes the new dynamic content. Publication enables the new dynamic content to be available to user devices such as cellular communication device 12 for example. Publication is preferably performed by placing the dynamic content in content repository 20, for delivery to cellular communication device 12. Content repository 20 then optionally and more preferably organizes the dynamic content into a dynamic content directory, which contains information about the available categories and units of dynamic content. Optionally, the distribution of the dynamic content may also include features for supporting financial remuneration, for example through subscriptions, as described in greater detail below.

With such a directory, units of dynamic content are optionally and preferably organized into a hierarchical structure of service packages, and/or categories and sub-categories, and are also more preferably associated with attributes which affect the business logic rules which may be inflicted upon a request by rule engine 128. Different filters and/or tools according to the present invention are optionally and preferably provided as rules in rule base 164 in order to customize the dynamic content according to the requirements and/or requests of the subscribers and to create implementation rules in rule engine 128 which enable speedy and flexible provision.

Optionally and preferably, one of the rules in rule base 164 determines whether the subscriber is eligible to receive a particular unit of dynamic content in order for rule engine 128 to allow the subscriber to receive such dynamic content through cellular communication device 12. For example, the subscriber could optionally have some type of subscription, to a particular unit of dynamic content but more preferably to a service package, or even to any such dynamic content available through cellular carrier 14, as well as variations thereof, or rule engine 128 may only verify the age of a subscriber in the event that a download request is received for a non-payable item of content having an age restriction, such as a minimum age requirement for example. Subscription is optionally and preferably performed through cellular carrier 14 and stored in subscription preferences repository 36, while the associations between subscriptions and the behavior of provisioning system 10 is determined by rules in rule base 164.

Each rule in rule base 164 is preferably composed of a triplet of events, conditions and actions (ECA). A simple example for a charging rule would be "every download of a basic application costs $1". Here, the trigger for applying the rule is an event of application download, the condition being that application's class is basic, and the outcome being an action for charging the price of $1. Another rule in the same policy could be "every download of a premium application costs $3". Here, the trigger for applying the rule is again an event of application download, the condition being that the application's class is premium, while the outcome is an action for charging the price of $3.

Examples of different types of events include but are not limited to, application-specific events which according to the preferred embodiments of the present invention are defined as events that are preferably generated by applications executed on the device, such as a game being played for example; or as events that are optionally and preferably generated in any computational device communicating with the device over a network as a consequence of the execution of an application, such as a stock trading server, for example, execution which causes a stock transaction to be executed.

Other events may also be system events which according to the preferred embodiments of the present invention are defined as events that are preferably and optionally generated by one or more components of the system. These events may optionally include but are not limited to, events optionally and preferably generated by the infrastructure such as an application download for example; or events that are preferably and optionally sent from the client, which may for example be generated by an application wrapper (a code that is automatically attached to the application and controls its execution) on the device, or alternatively generated by the dynamic content manager on the device. Each event is optionally and preferably associated with one or more parameters, for example, subscriber ID (identifier) and application ID. These parameters can optionally and more preferably be used in order to retrieve additional information about the context of the event.

A specific condition may optionally be added to each rule in the policy, which is based upon some predefined parameters so that for example the price of a specific event is flexible and may have multiple options given different conditions. For example, different prices may be charged at different times of the day. The condition is more preferably expressed as a logical expression which yields a true/false value. Examples of parameters for the condition include, but are not limited to, subscriber information, such as group, age, gender and other types of demographic information; content data, such as the name of the content item, the name of the content provider, size of the content, flavor, or type of limited resource or wireless device, and so forth; delivery conditions, such as delivery time, size, and so forth; and content-specific information. The subscriber and content data may optionally be retrieved from specific repositories, such as a content repository 20 and/or a subscriber preferences repository 36.

Dynamic parameters may also optionally be used in conditions. These parameters are preferably retrieved from the database or external system through pluggable operations. For example, an operation may be used to query the transaction database and retrieve the number of downloads that were performed by the subscriber in the last month. An example of an operation that uses an external server for such a query is retrieving the location of the subscriber.

When a rule is activated and its condition is met, the action is performed as defined in the rule. An example of an action is Charge which according to preferred embodiments of the present invention is defined as a request from an external system to charge the subscriber a fee for consuming a content item or bundle. In the case of Charge the subscriber, or user, of cellular communication device 12 is optionally and more preferably charged according to one of the following price specifications: a general price for the dynamic content, as set in the submission process; a price that is specified according to policy parameters; a price that is specified by the event which is sent by the application or a price that is determined by an external rating system. Other examples of actions are Send Notification, Grant Discount, Give Credit Points, Block Subscriber, Push Content and Restart Process (for system management)

According to preferred embodiments of the present invention, the business logic rule regarding application-specific charging is performed as follows. Each billing event of this type is triggered by the application or item of content itself and is determined in advance by the content provider, as previously described. For example, if the content provider has developed a new game, then optionally the subscriber could be charged each time another stage in the game is completed. The charging policy, or rule(s), would then be based upon events occurring within the application.

Optionally and most preferably, a policy editor (not shown) is used to define flexible business policies by the service provider. The same policy editor can be used to define application-specific policies by the developer and/or content provider, based on application custom events. The application developer and/or content provider can optionally and more preferably define the structure of the custom events, define charging rules based on these events, and create a business policy rule base. The policy file is optionally and preferably uploaded to the server and accessed by the content management mechanism, and optionally and more preferably executed by rule engine 128 when the application event is received. Business policies are described in greater detail with regard to FIG. 2A.

Charging for these transactions is then optionally and preferably performed through a charging module 23, which is optionally and more preferably located at provisioning platform 16 and subject to rules embodied in rule engine 128. Charging module 23 determines a price for consuming certain types of dynamic content by cellular communication device 12, optionally and more preferably according to the plurality of rules in base 164. In addition, subscriptions are preferably supported by subscriber preferences repository 36, which is part of provisioning platform 16. This repository of subscriber information contains information about different subscribers, their association with groups, eligibility to access various services, history of transactions, and any personal preferences. Rule engine 128 may optionally use subscriber preferences repository 36 as input to rules. For example, a rule for sending notifications can be triggered when a new application is published and send notifications to subscribers that have downloaded a previous version of the same application or have expressed their interest in this type of application. Here, subscriber preferences repository 36 is used as the basis for detecting previous downloads and reading the preferences of the subscriber, which are needed in order to execute the rule.

If download client 40 determines that the corresponding dynamic content should be downloaded by cellular communication device 12, then preferably download client 40 sends a request for the dynamic content itself to delivery module 42. Delivery module 42 then asks rule engine 128 for permission to download. Rule engine 128 then optionally and preferably assesses the business logic required to carry out the request.

Rule engine 128 may optionally determine a large and customizable array of alternatives. If, for non-limiting example, the content is promotional and free of charge, rule engine 128 preferably immediately returns an approval for the download. According to the preferred embodiments of the present invention, the rules themselves are customizable in accordance with the needs of cellular carrier 14. Therefore, the rules are optionally and preferably constructed according to any suitable logic structure, including but not limited to any expressible piece of logic which may be defined under the paradigm of event-condition-action, where actions differ depending on the outcome of the condition verification. Non-limiting examples of such conditions include the type of device, subscriber history, number of preceding downloads. The condition may optionally take any parameter of the event and use that as a key to retrieve information from the database, a non-limiting example of which is to check if a subscriber has already purchased other items in a bundled offer by referencing the subscriber record in subscriber preferences repository 36, preferably by using the subscriber identification number in the event as a key to subscriber preferences repository 36.

All three logical steps of event, condition and action are optionally extensible within the present invention, optionally and more preferably by creating a new API (application programming interface) plug to extend rule engine 128 to accept new events, or new functions in the condition or new actions commensurate with the new rule. One non-limiting example of such a condition added to a rule by a service provider that is based on the location of the provider. Conditions themselves may optionally be extended through one or more operations, which are functions performed or executed by the rule engine that return a value, which is then used for evaluating the condition. Operations differ from actions in that the latter are executed after an entire rule has been evaluated, while the former are performed or executed as part of a condition within a rule.

Rule engine 128 also is optionally and preferably involved in the management and control of the process of charging, and includes two modifiable modes of operation—prepaid synchronous and post-paid asynchronous. If the subscriber is using a prepaid payment method, naturally no actions can be taken before the debit is complete until payment is confirmed—this timed behavior is thus called synchronous behavior. The logic flow of the billing engine is dealt with in more detail in FIG. 3.

Figure 2A:
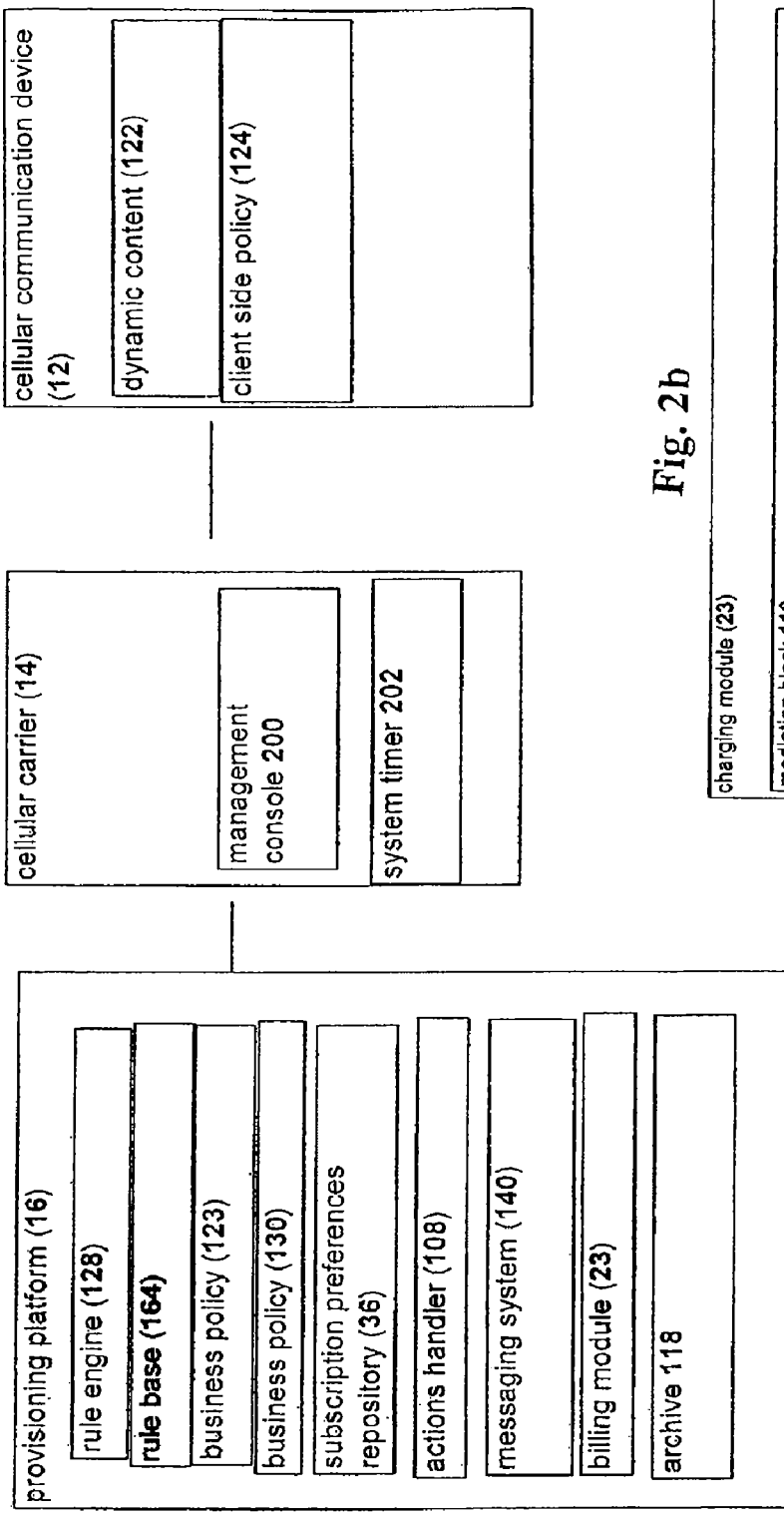

When delivery is approved by rule engine 128, optionally and preferably after ensuring payment, adapted dynamic content is then preferably dynamically generated and sent by delivery module 42 to cellular communication device 12. FIG. 2A shows a schematic block diagram of an exemplary system 121 according to the present invention for the management of a subset of rules which are the billing models of the system with additional details concerning a preferred implementation for such management according to the present invention.

As shown, a system 121 features cellular communication device 12, operated by a subscriber (not shown), who subscribes to cellular carrier 14, as previously described.

According to preferred implementations of the present invention, provisioning platform 16 communicates with the various components of system 121 through a messaging system 140 which is optionally and preferably responsible for distributing the events that are published by the various sources within system 121. Messaging system 140 may optionally be synchronous or asynchronous.

As shown, cellular communication device 12 is capable of executing and/or otherwise accessing and/or displaying and/or consuming one or more units of dynamic content 122 (application(s)). A client side policy 124 is optionally and preferably attached to each unit of dynamic content 122 and most preferably is executed and/or otherwise accessed locally by cellular communication device 12. Optionally and preferably, client side policy 124 is defined as a set of compiled rules that are optionally and preferably attached to an application and/or other type of content, shown herein as dynamic content 122, before the application is delivered to a client device, shown herein as cellular communication device 12. This policy preferably enforces the license agreement by which the application (dynamic content 122) was provided. For example, the application could optionally be provided under a license for a limited period of usage or a limited number of uses. Client side policy 124 optionally and preferably completes or otherwise complements the server side policy, by allowing some of the actions to be performed offline. Client-side policy 124 optionally and preferably enables applications to be executed without requiring an event to be sent to the server (provisioning platform 16). Optionally but not exclusively, client side policies 124 can be used in order to limit the number of times an application is allowed to run, to limit the period in which an application is valid or to allowing the license to be renewed online.

Optionally and preferably client side policies 124 are implemented through additional software components known as "wrappers" that are optionally and preferably generated automatically by the system, and optionally and more preferably provisioning platform 16, with or without the involvement of the developer or content provider. The wrapper optionally and preferably controls the execution of the application by checking the license terms each time the application is started. If the license is valid, the application is invoked, otherwise, the subscriber is notified and offered to renew the license. Without renewing the license, the subscriber (or more specifically, cellular communication device 12) is preferably not able to run the application.

Provisioning platform 16 is preferably able to serve one or more units of dynamic content to cellular communication device 12. A plurality of such units of dynamic content 122 may optionally be present on, and operated by, cellular communication device 12 (not shown).

Provisioning platform 16 preferably contains rule engine 128 which receives events and applies one or both of business policies 123, 130. Rule engine 128 performs any calculations which are required to authorize downloading of content, including the sums required for billing events, or events within the overall system of the present invention which actually trigger billing. These events are preferably received by cellular communication device 12, which communicates with the remaining modules of provisioning platform 16.

Rule engine 128 preferably analyzes incoming events, such as a request for particular content from a particular subscriber through a limited resource or wireless device. Rule engine 128 then determines which rule(s), of a plurality of such rules that are specified in business policy, should apply to the incoming event, calculates the conditions that are associated with these rules and operates the relevant actions. Actions handler 108 is responsible for actually executing the action from rule engine 128, both by interacting with other modules of the billing system, such as charging module 23 and by interacting with other modules of the provisioning platform.

According to preferred embodiments of the present invention, provisioning platform 16 optionally and preferably also features an archive 118 for storing the data which influenced the execution of particular policies, as well as the details of these actions. For example, archive 118 preferably stores information in order to be able to recreate each Call Detail Record (CDR), as well as those parameters and values which were used by rule engine 128 in order to determine a particular charge for a particular event. Archive 118 can optionally be used to generate reports for submission to the dynamic content developers and/or content providers, as well as for generating billing reports for the subscribers, as described in greater detail below.

In addition, archive 118 can also optionally be consulted for the history and details of billing actions in cases of suspected fraud. Rule engine 128 is optionally enabled to use fuzzy logic to detect fraud but is more preferably able to function in the event-condition-action manner described above. The fraud detection policy may optionally and preferably be modified and "plugged" in the identical manner as other types of business logic by each service provider (not shown), and shown as business policies 123, 130. Among the various functions, and without intention to limit other options, the fraud engine may optionally have as an action to alert a human controller to evaluate an event, or optionally block a subscriber for example.

According to the preferred embodiments of the present invention, a human representative of cellular carrier 14 is able to initiate events within the system from a management console 200. These initiated actions include, but are not limited to notification, push of content and so forth. In the event that it is decided to push a certain piece of content to a given cellular device 12, an event is preferably sent from management console 200 to rule engine 128 for approval according to the rules in rule base 164, including but not limited to which cellular device 12 are able to accept the content, which subscribers are subscribed to such content from subscription preferences repository 36, or which subscribers are eligible for a certain promotional discount from rule base 164 and so forth.

For each cellular communication device 12 that is found to be eligible, actions handler 108 preferably sends a content push request to delivery module 42 which then downloads the content to device 12. In the event that billing is required for the pushed content, actions handler 108 initiates billing activity in charging module 23 as outlined above.

Optionally and preferably, the manager may wish to carry out activities on management console 200 at a delayed timepoint that is later than the time of their input. Towards this end, a system timer 202 is preferably able to dispatch an event initiated by the manager at a delayed scheduled time.

In addition to the above functionality, rule engine 128 is optionally and preferably able to modify pricing according to discounts and bundled offers offered by the cellular carrier 14 by storing them as rules in rule base 164.

Figure 2B:
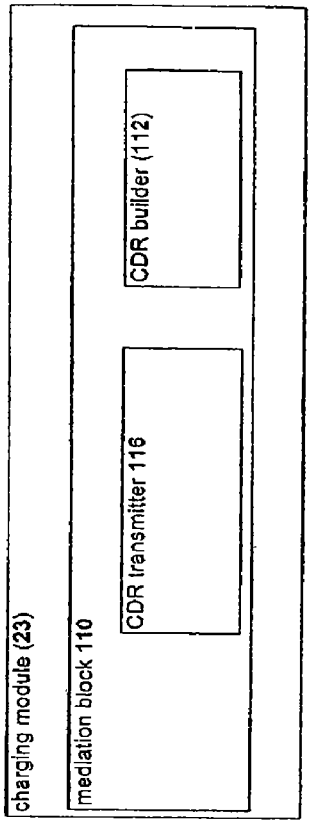
FIG. 2B shows a schematic block diagram of an exemplary billing system according to the present invention.

Turning to FIG. 2B, according to optional but preferred embodiments of the present invention, charging module 23 features a mediation block 110 for receiving charge commands from actions handler 108 (not shown; see FIG. 2A). Mediation block 110 then preferably submits a charge message to the outside billing system in the protocol of that billing system. For example, mediation block 110 could optionally communicate with the billing system of the cellular carrier according to the format or language of that particular billing system.

Optionally, mediation block 110 features a CDR builder 112 for receiving the charge command and for producing the CDR (call/charge data record) according to a format which is defined by the carrier (or other outside billing entity). The CDR is then transmitted to the external billing system (not shown) by a CDR transmitter 116. The data for the CDR may optionally be stored at charging module 23 and/or another module of the system as static data, or alternatively may be dynamic data which depends on the particular charging event, as received from actions handler 108 enacting the result of rule engine 128. Examples of static data include, but are not limited to, subscriber identification and profile information; dynamic content attributes, such as name, size and so forth; and content provider information. Examples of dynamic data include, but are not limited to, timing data (concerning the time period at which the triggering event occurred); the type of triggering event, such as download or application-specific events; and the amount to be charged or the rate of charging.

Auxiliary data may also optionally be attached to the CDR for validation purposes by the external billing system. Examples of auxiliary data include, but are not limited to, a unique identifier for the CDR; sequence information, such as a sequential number for each CDR, and so forth; the time of creation for the CDR; and metadata which defines the record type and/or record specific fields.

According to preferred embodiments of the present invention, the system (as shown with regard to FIGS. 1, 2A and 2B) is optionally and preferably capable of implementing business policies according to business models. For example, optionally and preferably the overall subset of the business policies by which a subscriber is charged for consuming a downloadable unit of dynamic content (i.e. an application that is provisioned to a wireless communication device) is referred to as a "dynamic content level business model". A dynamic content-level business model is the preferred method to enable the implementation of different business models for different units of dynamic content. That is, each unit of dynamic content optionally and preferably has an associated business model, preferably as specified by the provider of that unit of dynamic content. This flexibility is optionally and more preferably achieved by collecting information about the activities of the system and units of dynamic content and applying dynamic business models.

According to optional and preferred embodiments of the present invention, a business policy is optionally and preferably composed of a server side policy, optionally with a client side policy, and/or download policy which defines the conditions which must be met before units of dynamic content may be downloaded. Each of these policies is optionally and preferably associated with one or more parameters optionally and preferably provided with the unit of dynamic content.

According to optional but preferred embodiments of the present invention, business policies that may be considered include download-based billing, age and eligibility of the subscriber, where the subscriber is charged on downloading the dynamic content; usage-based billing, where the subscriber is charged for the number of times the dynamic content is used, or for the period in which the content is used; subscription-based billing, where the subscriber is charged a periodical fee for a limited or unlimited consumption of services and application-specific billing, where the subscriber is charged for performing various actions within the application (the meaning of these actions is may optionally be known only to, but at least is known by, the application). The above examples should be considered typical and illustrative and by no means exhaustive or exclusive.

One example of such a billing model is the "try and buy" model. The client-side policy states that free access is given a certain number of times according to the client side parameter. After this point, if the subscriber wants to continue to use the application, a renewal is requested from the server. The server, in response, charges a price according to its server-side policy parameter, after which the wrapper enables the original application. Download policy may optionally be to allow a single download for the purposes of trying the particular dynamic content.

Further examples of one-time billing models include the "One time fee" model where there is no client-side policy and the server side policy determines a single charge priced according to its policy parameter in response to download; the "limited usage" model where the client-side policy states that access is given a certain number of times after installation according to the client side parameter; the "time-limited usage" model where the client-side policy states that access is given for a certain period of time after installation according to the client side parameter, whereafter a billed renewal is requested from the server; the "pay per usage" model where each time the application is used and/or otherwise accessed, the client-side policy preferably requests a renewal from the server, which in response charges a price; the "Pay per download" model; the "flat subscription" model and so forth.

An example of a particular application-specific billing model could occur when an application supplies stock quotes which in general cost 10 cents per stock quote. Between 7:00 pm and 7:00 am, the stock quotes may optionally cost 5 cents. This is preferably implemented as a server-side policy only, with the different prices as its parameters and the provision of the stock quotes as its events.

FIG. 3 is a system diagram delineating exemplary but preferred functionality of an exemplary rule engine according to the current invention, as part of provisioning platform 16. As shown, delivery module 42 optionally sends an authorization request to rule engine 128. This request optionally and preferably takes the form of function call request 201 to an existing procedure already loaded into memory on an available computer, but may optionally create its own instance upon each calling. According to preferred embodiments of the present invention, request 201 is preferably transmitted to rule engine 128 through messaging system 140, which as previously described, preferably transmits messages between all components of provisioning platform 16.

Rule engine 128 also optionally and preferably accesses various repositories in order to determine one or more conditions. Upon receiving one or more events, rule engine 128 optionally and preferably selects relevant rules. Each rule is preferably activated separately on every discrete transaction request received, by evaluating appropriate conditions and more preferably executing an action if a condition is met. Rule engine 128 optionally and preferably implements the various policies of the cellular operator, optionally created in XML format and optionally and preferably by using the policy editor (not shown).

These policies include but are not limited to an aggregation policy where content submitted may be included, rejected or pushed according to the status of the content and content provider 18 which is referenced as a key in a search of server side policies 130 on the event of an upload.

An optional and still more preferable result of an action is generation of a billing record (CDR) by actions handler 108 which then most preferably transmits billing records to external billing system 134 in a configured protocol, as defined by external billing system 134. For the exemplary embodiment shown herein, messaging system 140 also transmits messages from provisioning platform 16 to external components, such as external billing system 134.

Provisioning platform 16 is also optionally and preferably in communication with one or more content providers 18. Although a plurality of such content providers 18 may optionally be in communication with provisioning platform 16, only one such content provider 18 is shown for the purposes of illustration only and without any intention of being limiting. One or more content providers 18 may optionally run back-end (i.e. server component) application 138.

According to optional and more preferred embodiments of the present invention the process of defining and applying business models involves content provider 18, service provider (not shown), which may optionally be for example the owner of provisioning platform 16, and subscriber (also not shown). Optionally and more preferably, a service provider pre-defines business models that are optionally and preferably used by content providers 18. These business models can most preferably be easily customized by specifying optional parameters optionally and preferably for server-side policy 130 (typically but not exclusively price) or optionally and preferably client-side policy 124 (typically but not exclusively number of allowed uses). Optionally and more preferably, a service provider is responsible for reviewing and approving application-specific business models and parameters for pre-defined business models that are submitted by content providers 18.

More preferably, when the dynamic content is submitted, content provider 18 preferably selects an applicable business model and optionally and more preferably provides parameters. Content provider 18 optionally and still more preferably defines new business models by more preferably and optionally composing new policies for one or both of mobile application (i.e. running on the device such as a cellular telephone for example) and backend application 138. Optionally and most preferably, policies are submitted through files that are generated by a policy editor (not shown). For dynamic content-specific business models, this is the most preferred way in which content provider 18 can associate rules with events that are generated from within the application (not shown).

A subscriber (end user) can optionally select from multiple business models before downloading the dynamic content. Alternatively, the subscriber may optionally be allowed only to select a particular dynamic content, but not the business model, which is then selected by system 121. In any case, system 121 preferably performs a series of actions in order to follow a particular business model. Once a specific business model is selected, delivery module 42 preferably generates an event that indicates the selected model and optionally the price that was calculated by synchronous rule engine 128. This event is received by the asynchronous rule engine, which uses the information inside the event in order to generate a CDR.

More preferably, system 121 determines whether a subscriber is allowed to download the dynamic content, according to download policy (not shown). Optionally and still more preferably, system 121 attaches client side policy 124 to the application (dynamic content), most preferably with one or more relevant parameters, such that client side policy 124 is sent to cellular communication device 12, most preferably with the application.

According to preferred implementations of the present invention, a business model is preferably processed by system 121 in several stages. During the provisioning and execution of the application/dynamic content, one or more events are optionally and preferably generated.

A "dynamic content delivery/installation" event is optionally and preferably generated by provisioning platform 16 when the dynamic content is preferably delivered to cellular communication device 12 (not shown; see FIGS. 1 and 2A) or optionally and more preferably installed on cellular communication device 12 (optionally and preferably reported by cellular communication device 12 itself). This event, and those events which are described in greater detail below, may be generalized to any type of dynamic content but are described herein with regard to applications for the purpose of discussion only, and without any intention of being limiting.

An "application start" event is optionally and preferably generated by the dynamic content on cellular communication device 12 (in this example, as an application) and optionally and more preferably handled locally by client side policy 124, which may send this event to the server.

Periodic events are optionally and preferably generated by system 121 at specific defined time intervals (typically but not exclusively once a day, week, month, etc.) and are optionally and preferably are used for triggering subscription charging. Examples of such subscription charging are described above.

License renewal events are optionally and preferably generated by provisioning server 16 to indicate that a subscriber has asked to renew a license for a dynamic content. Application-specific events are optionally and preferably generated by the mobile application (on the subscriber device; not shown) or optionally by backend application 138 on the occurrence of various activities, preferably with regard to actions on, by or with the dynamic content.

As previously described, events are optionally and more preferably reported to system 121 through HTTP. For server-side events, event distribution is optionally and preferably done through an internal messaging mechanism.

Figure 4:
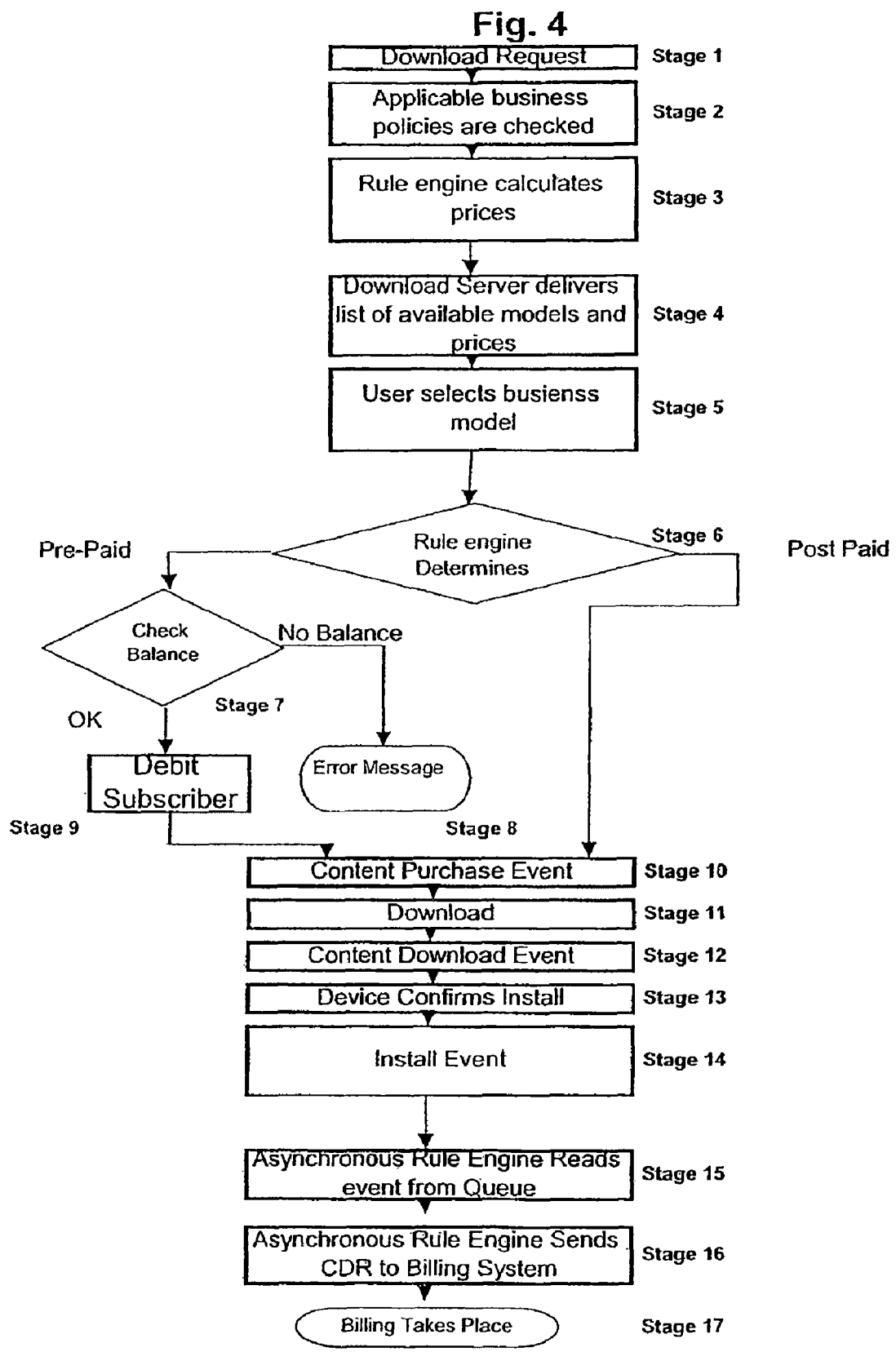
FIG. 4 is a flow chart of the flow of control in a billing model according to the preferred embodiments of the present invention.

FIG. 4 is a flow chart of the flow of control in a content delivery session according to the preferred embodiments of the present invention. In stage 1 the limited resource or wireless device sends a download request. In stage 2, the rule engine checks the applicable business policies and then in stage 3 calculates the prices. In stage 4, the download server returns a list of available billing models and their prices to the subscriber device. In stage 5, the subscriber selects a specific business model and confirms the price. A confirmation is sent to the download server. In stage 6, the rule engine checks the payment method of the subscriber.

If the subscriber is found to be pre-paid, then in stage 7, the balance of the subscriber is checked in the pre-paid system. This branch of processing is by definition synchronous for pre-paid systems, and the rule engine co-resides with the component that triggers the rule engine. The triggering component, the download server, invokes the rule engine with an event and waits for the completion of the event processing while the rule engine applies the rules and returns a result.

If the subscriber is found to have insufficient balance, then in stage 8 an error message is sent. In the event that sufficient funds are available, in stage 9 the subscriber is debited. In stage 10, the download server issues a content purchase event and then in stage 11 the download server delivers the content to the device. Once the download is complete, in stage 12, the download server issues a content download event and in stage 13 device sends an install notification, confirming that the content has arrived. In stage 14, the download server issues an install event which in stage 15 is read from the message queue by the asynchronous rule engine. In stage 16, this is then billed when a CDR (Call Detail Record) is sent from the rule engine to the billing system which affects the billing in stage 17.

For post-paid subscribers, billing may optionally be triggered by any of the plurality of events that are issued by the download server in stages 10, 12 and 14 in an asynchronous manner.

Figure 5:
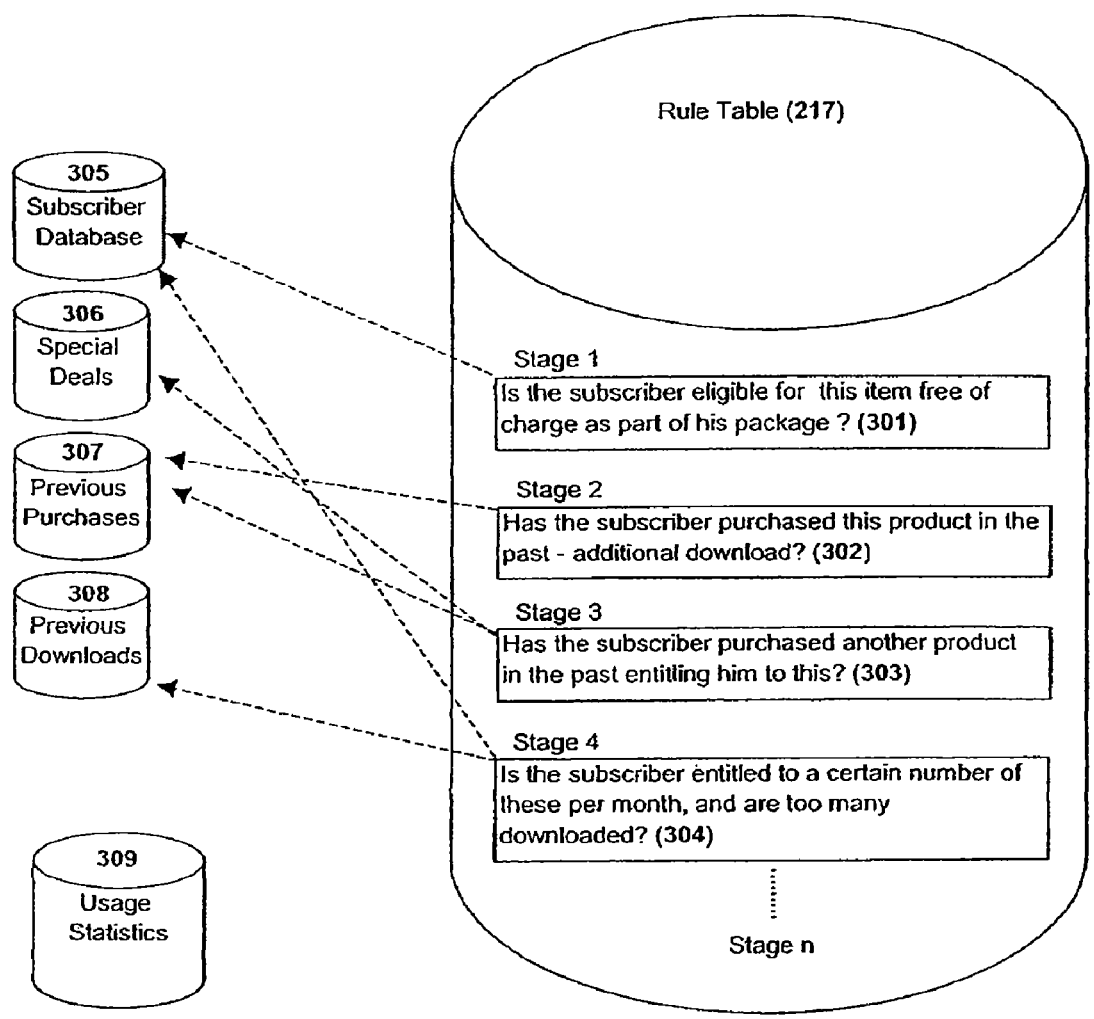
FIG. 5 is a schematic depiction of logical steps to determining price by the rule engine.

FIG. 5 is a schematic depiction of logical stages to determining price by the rule engine. These optional and preferable logical stages are carried out in accordance with "event, condition and action" where each stage is a condition that generates an action, this action optionally being either the invocation of the next rule, or the approval of the download with the appropriate price. Each stage references the appropriate repositories of information 305-308, and returns a Boolean, where yes is a charge instruction and no is depicted by the arrows which lead to the next stage, which in its turn may deliver appropriate permissions and pricing.

A non-limiting example of such a set of stages, which are preferred embodiments of the present invention, may have as stage 1 client eligibility without any billing 301 which optionally references the table of client entitlement only 305. Stage 2 optionally checks previous transaction of purchasing the same content item, which may have been erased 302 and optionally references previous purchases 307. Stage 3 optionally processes special deals with cross-entitlements 303 ("bundled offers) such as "buy 5, get one free" deals, optionally referencing both entitlements 306 and previous purchases 307. In another embodiment of rule-stages, the engine checks other billing methods where the client may be entitled to a certain number of downloads 304, but it must be verified how many previous downloads 308 were carried out, and furthermore the engine ratifies any other possibility ensuing from the above, combinations thereof or other unmentioned billing rules.

Also displayed in FIG. 5 is an optional and preferable database of usage statistics 309 which is optionally updated by the rules according to whichever of them is invoked or which is rejected in order to facilitate such information as for example age breakdowns, demographics, download times and so forth.

Figure 6:
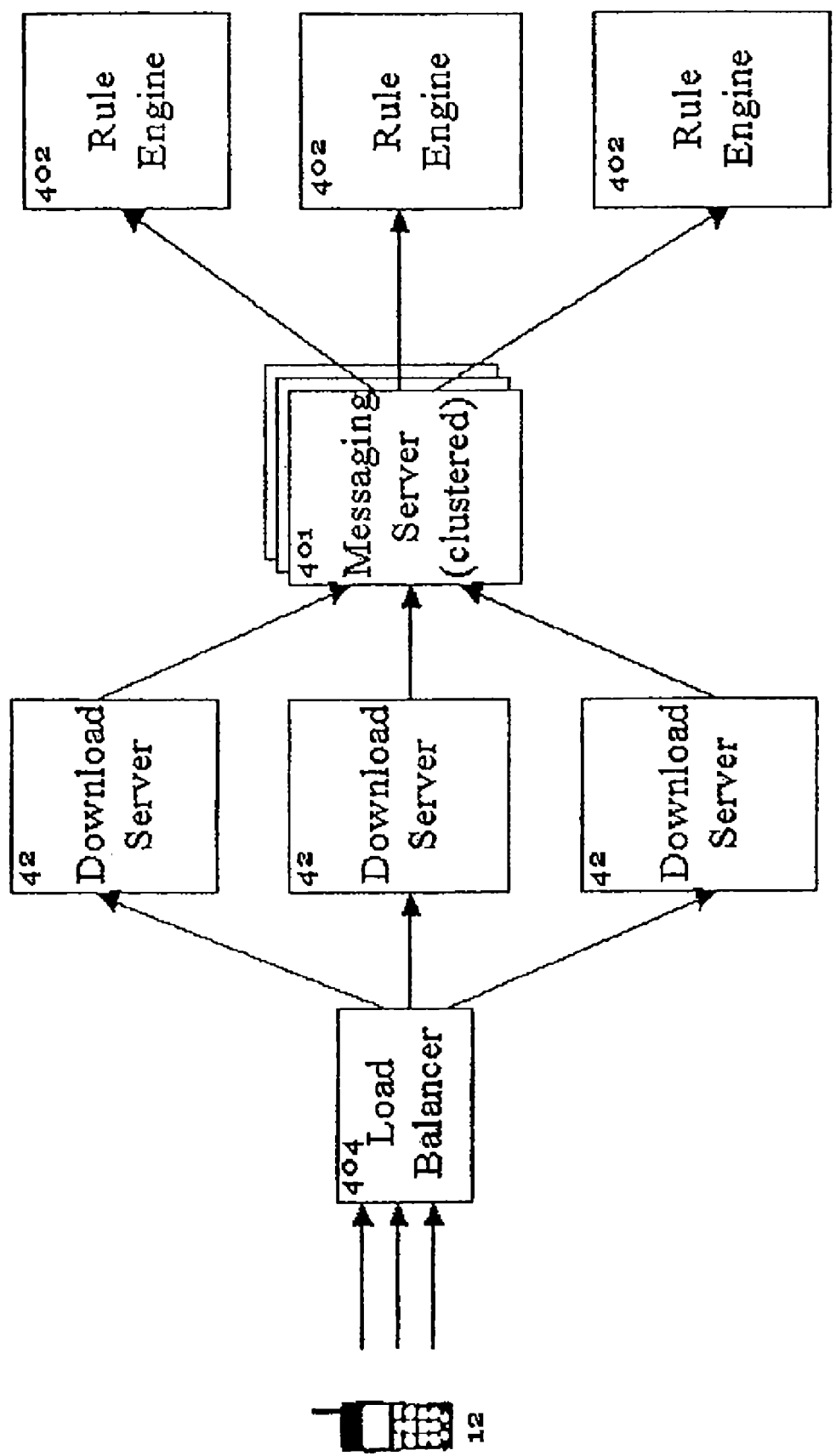
FIG. 6 is a schematic block diagram of exemplary scalable hardware configurations according to the present invention.

FIG. 6 is a schematic block diagram of exemplary scalable hardware and/or software configurations according to the present invention. Here the capacity to instantiate different models in different machines allows two levels of load balancing which are highly optimized. Initially requests from cellular device 12 are load balanced between a number of download servers 42 by load balancer 404 optionally without analyzing the needed rule-models or reading requests. Load balancer 404 distributes requests from cellular device 12 to the various download servers 42 according to a variety of criteria, including but not limited to which content is requested (allowing each download server 42 to hold only certain content in its storage), which area the request is made from (distributing download servers geographically near relay stations), using round-robin policy, or randomly for example. Any combination of criteria may also optionally be used.

Download servers 42 then sends requests to messaging server cluster 401 which distributes them further. Rule engines 402 may be structured according to a number of different criteria in order to maximize their speed and efficiency. Examples of distribution criteria include, but are not limited to the following possibilities.

According to an optional embodiment of the present invention, each rule engine 402 may optionally hold a certain rule set. In such an embodiment, rule base 164 (shown in FIG. 1) may be distributed in a number of subsets within each computer which also holds rule engine 402, thereby optimizing the communication between each rule engine 402 and its set of rules. In such a configuration, messaging server cluster 401 manages virtual queues and distributes messages accordingly. Each instance of rule engine 402 is preferably configured to work on a specific queue.

The number of download servers 42 and rule engines 402 may be increased indefinitely, creating theoretically unlimited scalability and load control.

Figure 7:
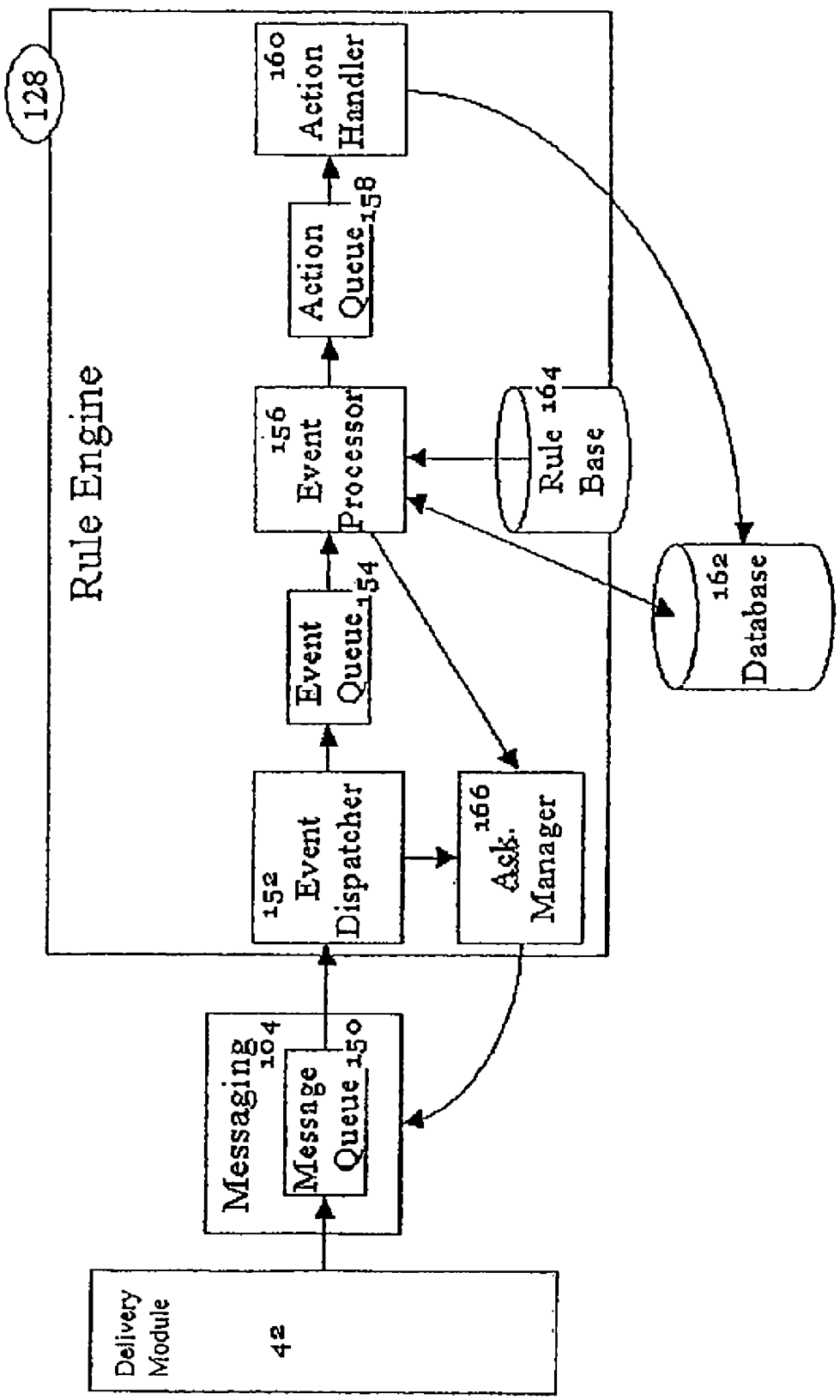
FIG. 7 is a schematic diagram of process control in a scaled, post-paid asynchronous billing model according to the preferred embodiments of the present invention.

FIG. 7 is a schematic diagram of a generic event processing flow as performed by the asynchronous rule engine according to the preferred embodiments of the present invention. An event is placed on message queue 150 by a front-end component, such as delivery module 42. The event is read from the message queue by event dispatcher 152, which places the event on event queue 154. Event dispatcher 152 notifies acknowledge manager 166 of the event.

The event is read from event queue 154 by event processor 156 which reads the applicable rules based on the event type from rule base 164. Event processor 156 extracts the necessary information from database 162 based on the applicable rule and creates the context of the event, whereafter event processor 156 calculates the conditions set by the applicable rule and which actions need to be executed. Event processor 156 then stores the event, its context and the actions that need to be executed as a result of the rule in database 162.

Event processor 156 notifies acknowledge manager 166 that the event has been processed, after which acknowledge manager 166 acknowledges receipt of the event to messaging server 104, allowing the message to be released. Event processor 156 places the action on action queue 158 and action handler 160 reads the action from the queue and executes the action. Action handler 160 records the result of the action in database 162 independently of the event processing pace of rule engine 128. It will be noted that in the asynchronous embodiment of the present invention, rule engine 128 resides in a separate process and the component that issues the event, running in the context of delivery module 42 is unaware of its existence. Optionally several instances of rule engine 128 may process events from the same queue 150 (not shown), thus allowing the system to be scalable.

While the invention has been described with respect to a limited number of embodiments, it will be appreciated that many variations, modifications and other applications of the invention may be made.

What is claimed is:

1. A method for implementing a policy for provisioning a dynamic content to a limited resource device (LRD) through an integrated platform, the method comprising:
    receiving an event associated with a dynamic content request from a LRD application;
    evaluating the event using sequential processing according to one or more application-specific policy defining business rules associated with said LRD application, said policy business rules being structured according to an ECA (event-condition-action) model, such that each rule is triggered by an event, and wherein said rule engine evaluates a condition to determine whether an action should be executed; and
    interacting with the LRD according to said evaluation.

2. The method of claim 1, wherein the limited resource device is a wireless communication device.

3. The method of claim 2, wherein the limited resource device is a cellular communication device.

4. The method of claim 1, wherein said at least one rule includes an event, a condition and an action, said event at least including said request, said condition being determined according to at least one characteristic of said request and said action being determined according to at least one characteristic for delivering the dynamic content.

5. The method of claim 4, wherein said event is a request to receive the dynamic content for downloading to the limited resource device.

6. The method of claim 4, wherein said event is generated by a user application as operated by the limited resource device, such that said request is received from the user application.

7. The method of claim 4, wherein said condition is determined according to at least one parameter selected from the group consisting of subscriber information regarding a user of the limited resource device, data related to the dynamic content, delivery conditions for delivering the dynamic content and information which is specific to the dynamic content.

8. The method of claim 4, wherein said condition further comprises an operation for being executed to determine said condition.

9. The method of claim 8, wherein said operation comprises retrieving information from a database.

10. The method of claim 9, wherein said information is related to a previous action by a user interacting with the limited resource device.

11. The method of claim 9, wherein said information is subscriber information.

12. The method of claim 1, wherein at least information about said event is stored.

13. The method of claim 12, wherein said information is analyzed during said analyzing of said event for applying said at least one rule.

14. A system for management of provisioning and using a dynamic content, the system comprising:
   a messaging system for communicating between a limited resources devices (LRD) a provisioning platform and a rule engine;
   the messaging system adapted to:
   receive an event associated with a dynamic content request from an LRD application;
   evaluate the event using sequential processing according to one or more application-specific policy defining business rules associated with said LRD application, said policy defined business rules being structured according to an ECA (event-condition-action) model, such that each rule is triggered by an event, and wherein said rule engine evaluates a condition to determine whether an action should be executed; and
   interact with the LRD according to said evaluation.

* * * * *